United States Patent Office 3,120,483
Patented Feb. 4, 1964

3,120,483
COMPOSITE SILICA-ZIRCONIA HYDROCRACKING
CATALYST AND PROCESS
Rowland C. Hansford, Fullerton, and Dean Arthur Young, Yorba Linda, Calif., assignors to Union Oil Company of California, Los Angeles, Calif., a corporation of California
No Drawing. Filed Apr. 20, 1961, Ser. No. 104,260
9 Claims. (Cl. 208—110)

This invention relates to methods for the catalytic hydrocracking of high boiling hydrocarbon oils to produce therefrom lower boiling fractions such as gasoline or jet fuel. More particularly the invention concerns the use of certain novel catalysts for the hydrocracking, said catalysts being composed of coprecipitated silica and zirconia, with or without a small amount of a group VIB, or group VIII metal promoter. The hydrocracking process itself consists in passing the high boiling feedstock in admixture with hydrogen over the catalyst at suitable temperatures, feed rates, pressures, etc., to effect a substantial conversion of the high boiling hydrocarbons to lower boiling materials in the desired range. Simultaneously, the organic sulfur and nitrogen compounds are largely decomposed to hydrogen sulfide, ammonia and hydrocarbon fragments.

It is a principal object of this invention to provide efficient and selective catalysts for the hydrocracking of mineral oils, which will effect a maximum conversion to gasoline-boiling-range products of unusually high ring-hydrocarbon content, and a minimum of destructive degradation to products such as methane and coke. Another object is to provide optimum process conditions for the utilization of such catalysts. A further object is to provide hydrocracking catalysts which are more economical than previously utilized catalysts. A still further object is to provide methods for effectively desulfurizing and denitrogenating high boiling feedstocks. A specific object is to provide catalysts which are effective for the hydrocracking of such highly refractory stocks as cycle oils from conventional thermal or catalytic cracking, whereby additional conversion to gasoline may be obtained. Other objects and advantages will be apparent from the description which follows.

It is well known in the art that combinations of silica with certain transitional, or non-transitional metal oxides, are useful catalysts for the pyrolysis of hydrocarbons at elevated temperatures in the absence of added hydrogen. Composites of silica and zirconia are specifically known in such uses. Zirconia in fact appears to be the only transitional metal oxide which is known to form an active cracking catalyst with silica. However, none of these silica composites have been regarded as possessing any significant hydrocracking activity.

It is also known that certain of the above types of cracking catalysts may be composited with e.g. 5–10% by weight of certain hydrogenating components, notably the sulfides or oxides of transitional metals, especially those of chromium, molybdenum, tungsten, iron, cobalt and nickel, and that the resulting composites are useful hydrocracking catalysts. The use of such hydrogenating components is absolutely essential to impart any significant hydrocracking activity whatever to conventional cracking catalysts such as silica-alumina, or silica-magnesia. "Hydrocracking activity" herein refers to the capacity of a catalyst to give increased gasoline yields in the presence of hydrogen, as compared to the yields obtainable under like conditions in the absence of hydrogen. Thus, a catalyst which gives essentially the same gasoline yield in the presence of hydrogen as in the absence of hydrogen, has no hydrocracking activity but is merely a cracking catalyst.

In the case of the silica-zirconia catalysts of this invention, it has been found that a substantial and useful hydrocracking activity is exhibited in the total absence of any conventional hydrogenating component. The essential catalyst components are hence silica and zirconia in intimate, coprecipitated admixture. It has further been found that this base catalyst may be further promoted by the addition of conventional hydrogenating promoters. Suitable promoters include in general the transitional metals of groups VIB, and VIII, as well as their oxides and/or sulfides. Specific examples include chromium, molybdenum, tungsten, iron, cobalt, nickel, rhodium, platinum, palladium, iridium and the oxides and sulfides thereof. Mixtures of any two or more of such components may also be used.

These promoters are employed in amounts ranging between about 0.2% and 30% by weight of the finished catalyst, based on free metal. The noble metals, however, are generally employed in amounts of about 0.2% to 2.0%. When operating at pressures below about 2,500 p.s.i.g. and/or at temperatures below about 750° F., it is preferred to employ at least about 0.5% of the noble metal promoters, or at least about 10% of the non-noble metal promoters.

It is generally believed that catalysts comprising silica in combination with alumina, magnesia, or zirconia all owe their cracking activity to the acidic centers created by the interaction of silica and water with these oxide components. Moreover, it has been demonstrated that this group of catalysts is without substantial hydrogenation activity at low pressures of hydrogen, since hydrogen acts merely as an inert diluent. Even at elevated pressures of hydrogen, a typical commercial silica-alumina catalyst exhibits little, if any, true hydrogenation activity in the decomposition of hydrocarbons. The present invention is based essentially upon our discovery that the specific silica-zirconia composites described herein develop important and useful hydrogenating activity at high hydrogen pressures, e.g., above about 500 p.s.i.g. of hydrogen pressure. This characteristic sharply distinguishes the silica-zirconia catalysts from other known cracking catalysts such as silica-alumina, silica-magnesia, activated clays, and the like.

The base compositions found to be most useful for hydrocracking comprise those which contain between about 25% and 90%, preferably 30%–70% by weight, of zirconia, the remainder being essentially silica. Conventional compositions, containing e.g. 10%–15% $ZrO_2$, may be quite active, but are found to be relatively non-selective, producing relatively larger amounts of coke and light hydrocarbon gases such as methane.

In the preparation of the active silica-zirconia composite it is essential that the two components be extremely intimately mixed, such as is achieved by coprecipitation of the hydrous gels of silica and zirconia. The composites prepared by this method are found to exhibit a considerably higher activity than those prepared by other methods such as impregnation, and they are in general more heat stable.

One method of effecting coprecipitation involves forming an aqueous solution of acidic compounds of both components, e.g., fluosilicic acid and zirconyl chloride, and then admixing the resulting solution with a suitable alkaline solution such as ammonium hydroxide or sodium hydroxide to thereby effect a coprecipitation of the hydrous oxides of silica and zirconia. The precipitate is then removed by filtration, washed exhaustively to remove contaminating ions, dried and calcined.

Another and preferred coprecipitation process may be carried out by forming an aqueous solution of sodium silicate, and mixing the silicate solution with a second solution of soluble acidic zirconium salt, e.g., zirconium sulfate, or zirconyl chloride. Depending upon the ratio of silicate salt to zirconium salt, it may be necessary either to add excess alkali (e.g. $NH_4OH$) to the silicate solution, or excess acid (e.g. HCl) to the zirconium solution.

Any suitable soluble salts or hydrosols of silica and zirconium may be employed in the above or other coprecipitation methods. The general objective is to obtain an intimate mixture of the hydrous oxides, or of insoluble compounds which may be transformed to the oxides upon calcining. Suitable materials for preparing coprecipitated composites include for example zirconyl chloride, zirconyl bromide, zirconyl iodide, zirconium sulfate, zirconium acetate, sodium silicate, potassium silicate, fluosilicic acid, silica hydrosols, and the like. The zirconyl halides may be formed in situ by adding to water the corresponding tetrahalide of zirconium.

In one modification, a mixture of crude silica and zirconia may be digested with hydrofluoric acid until both components are dissolved, and the resulting solution then neutralized with alkali, thereby precipitating the mixed hydrogels. It should be noted that both of the hydrous oxides are generally coprecipitable over the pH range from about 3 to 12.

The coprecipitated gels prepared by any of the above methods are recovered as by filtration or the like, washed exhaustively, dried and calcined at e.g. 500–1,500° F. for one to 24 hours. If the hydrous gels are contaminated with alkali metals, it is preferable to leach with ammonium sulfate or ammonium chloride solutions to replace the alkali metal ion with ammonium ion which is decomposed during calcining.

An important consideration in preparing the coprecipitated gels involves the hydrogen ion concentration of the aqueous medium in and surrounding the immediate zone of precipitation. It has been found that when alkaline sodium silicate solutions are stirred gradually into a large volume of acidic zirconium salt solution, whereby the precipitation occurs in a predominantly acidic environment, the resulting catalysts are generally much less active than those prepared by gradually stirring the acidic zirconium solution into a large volume of alkaline silicate. In the latter case, the precipitation occurs in an environment which is largely alkaline. It is therefore preferred that the coprecipitation be carried out under conditions such that the major environment is one of alkalinity, i.e. at a pH between about 7.5 and 12. Repeated experiments have demonstrated that catalysts prepared by coprecipitating in acid environment, i.e. at a pH between about 2 and 6, are less active than catalysts of the same nominal composition precipitated under alkaline conditions, although the former do display a significant, desirable activity.

The preferred manner of carrying out alkaline coprecipitation consists in injecting separate streams of alkaline silicate solution and acidic zirconium solution into a mixing zone, and providing rapid agitation therein. It is preferred to introduce the alkaline solution near the point of introduction of the acidic solution, and to provide good agitation directly in the intermediate zone. To provide a suitable alkaline environment, a slight stoichiometric excess of alkali may be included in the silicate solution, or a suitable alkali or buffer salt may be supplied initially to the mixing zone. Any of these techniques provide for coprecipitation at a substantially constant pH level which is readily controllable by varying the proportion of excess alkali present.

As indicated above however, alkaline coprecipitation may also be obtained by introducing the acidic zirconium solution gradually with stirring into a large batch of the alkaline silicate solution. This technique does not provide precise control over the pH level; the precipitation ordinarily commences at a high pH of about 12 or 13, and then at successively lower levels down to about 6 when all of the zirconium solution has been added. Maintaining a constant pH of precipitation is not so critical as is the avoiding of precipitation at below about pH 7.5.

It has also been found that the deleterious effects of acidic or neutral coprecipitation can be overcome to a large extent by aging the coprecipitated slurry at a pH of about 7.5 to 12 for a sufficient length of time. Ordinarily about 10 minutes to 5 hours aging period is sufficient at room temperatures, depending upon the pH.

The desired promoter may be incorporated into the catalyst by coprecipitation along with the other components, or it may be added by impregnation following the filtering and drying of the silica-zirconia composite. Coprecipitation is ordinarily preferred, and for this purpose a soluble salt of the desired promoter is simply included along with the silicate solution or the zirconium solution. Ordinarily it is preferred to use an acid-soluble, base-precipitable salt. For example iron chloride, cobalt nitrate, nickel nitrate, or chromium sulfate may be included with the zirconium solution and will be precipitated as hydroxide or hydrous oxide upon admixing with the alkaline silicate solution.

For purposes of impregnation, an appropriate solution of a salt of the desired metal or metals is first prepared, and the dried or calcined base is then immersed in the solution, allowed to soak for a few minutes, drained, dried and calcined. Preferred metal salts include the nitrates, acetates, formates, sulfates, and the like. Alkaline salts such as ammonium molybdate, ammonium tungstate, ammonium chromate, and the like may also be employed. When more than one promoter is employed, the appropriate salts may be simultaneously or alternately impregnated. Where alternate impregnation is employed, it is preferable to dry or calcine the catalyst between the separate impregnation steps.

In any of the above preparation methods the composites may be formed into pellets or granules at various stages in the manufacture. The moist powders may be compressed or extruded to form pellets prior to calcining, or the calcined, powdered gels may be compressed to form the desired pellets. Ordinarily it is desirable to employ the catalyst in the form of pellets or granules ranging in size from about 1/16-inch to 1/2-inch in diameter. In forming such pellets it may be desirable to employ minor proportions of binders such as hydrogenated corn oil or the like, and in case the dry materials are to be pelleted, a small proportion, e.g., 1–2% by weight, of graphite may be incorporated therein to act as a lubricant. The binders and lubricants, if employed, are removed by combustion during the final calcining. Those skilled in the art will readily appreciate that other compounding and pelleting procedures may be employed.

The above catalysts may be utilized for hydrocracking a great variety of mineral oil feedstocks, which are generally high boiling fractions derived from petroleum stocks or shale oils. The catalysts are especially useful for hydrocracking refractory cycle stocks from conventional cracking operations, coker gas oils, or alternatively they may be used for hydrocracking virgin gas oils to prevent the buildup of refractory residues from the cracking operation. Any of these feedstocks may also contain organic sulfur in amounts up to about 4% by weight, and organic nitrogen in amounts up to about 2% by weight. In the hydrocracking process these sulfur and nitrogen compounds are largely decomposed.

It is well known that the conventional cracking of petroleum stocks, such as virgin gas oils from any type of crude oil, invariably leads to the production of a considerable proportion of a fraction which boils in the same range as the initial charge stock, but which is much more refractory toward further cracking. This is true whether the cracking process is non-catalytic or catalytic, and as a result there are definite limitations on the degree to which profitable recycling of this fraction to the cracking operation can be practiced. The effect of increased refractoriness of the "unconverted" portion of a cracking stock is particularly limiting in the case of catalytic cracking, so much so that only small recycle ratios are generally employed, further conversion of the recycle stock often being effected in a subsequent thermal cracking operation. Recycling to extinction invariably results in poor selectivity of the conversion to gasoline as a result of excess formation of carbonaceous catalyst deposits and of light hydrocarbon gases. This is also true in thermal cracking, except that instead of carbonaceous catalyst deposits a large amount of heavy tar of high carbon content is formed.

The refractoriness of cracked recycle stocks is the result, principally, of the formation of polynuclear aromatic hydrocarbons through reactions of dehydrogenation, hydrogen transfer, cracking, cyclization or condensation. It is well known, for example, that recycle stocks from catalytic cracking have a high content of methylnaphthalenes. These may be formed by the cracking of long side-chains or of saturated rings attached to a naphthalene nucleus, by the dehydrogenation of polynuclear naphthenes or aromatic-naphthenes such as alkyltetralins, or even by the polymerization and cyclization of olefins produced from saturated hydrocarbons or alkyl side-chains. In thermal cracking, one important mechanism of polynuclear aromatic hydrocarbon formation is the condensation of diolefins with aromatics of lower ring content.

In catalytic cracking another important factor leading to apparent refractoriness is the accumulation of pyridine- or quinoline-type compounds in the recycle stock. These basic nitrogen compounds exert a temporary poisoning effect on the acidic catalyst centers, and low conversion of the cycle stock results.

The above-noted difficulties are avoided or minimized by the process herein described. Thus, by preventing complete dehydrogenation of polynuclear naphthenes to polynuclear aromatics, by hydrogenating at least partially the polynuclear aromatics already present in the charge stock, by preventing high olefin or diolefin content with subsequent reactions of polymerization, cyclization, or condensation, and by decomposing basic nitrogen compounds to ammonia, relatively high partial pressures of hydrogen can permit a maximum theoretical conversion of heavy hydrocarbons of all types to hydrocarbons boiling in the desired gasoline range.

From the above discussion it will be apparent that the catalysts of the present invention may be used advantageously in the hydrocracking of virgin gas oils, whereby greater conversion to gasoline is obtained in a once-through operation than would be obtained in a similar once-through operation in conventional cracking processes, and also the "unconverted" fraction is not greatly degraded with respect to refractoriness, and may hence be recycled substantially to extinction. It will be apparent also that the catalyst may be employed to treat the refractory residues from conventional cracking operations whereby a substantial yield of high quality gasoline is obtained. The residue from this operation may likewise be recycled either to the hydrocracking step or back to a conventional cracking step in the absence of hydrogen.

The hydrocracking conditions employed herein involve passing the vaporized hydrocarbons over the finished catalyst at temperatures ranging between about 600° and 950° F., hydrogen pressures between about 500 and 5,000 p.s.i.g., and space velocities ranging between about 0.1 and 10.0. The preferred hydrogen ratios may range between about 1,000 and 10,000 s.c.f. per barrel of feed. The minimum hydrogen pressure of about 500 p.s.i.g. is critical herein, especially when treating highly refractory, aromatic cycle stocks; at lower pressures dehydrogenation is favored, resulting in increased aromaticity and refractoriness of the stock.

The following examples are cited to illustrate the effectiveness of the herein described catalysts, but such example should not be construed as limiting in scope.

EXAMPLE I

A series of pure silica-zirconia catalysts were prepared by slurrying pure silica hydrogel in aqueous solutions of pure zirconium sulfate, and adding ammonia to the slurry to precipitate hydrous zirconia. This technique is thus a combination of impregnation and alternate precipitation. The finished catalysts were prepared by filtering off the mixed hydrogel, washing, drying and pelleting with 2% Sterotex as a lubricant. The ⅛-inch pellets were then calcined for 4 hours at about 1,100° F.

The resulting catalysts were then tested for hydrocracking activity, using as feed a light cycle oil from a fluid catalytic cracking unit, the cycle oil having a 650° F. end-point and an API gravity of 21.3° at 60° F. The hydrocracking conditions were: temperature—900° F., pressure—1,000 p.s.i.g., liquid hourly space velocity—0.5, hydrogen—8,000 s.c.f. per barrel. The results were as follows:

Table 1

| No. | Catalyst Comp., Wt. percent | | Conversion, Vol. percent of Feed | $C_4^+$ gasoline yield, Vol. percent of Feed | Selectivity[b] |
|---|---|---|---|---|---|
| | $SiO_2$ | $ZrO_2$ | | | |
| 1 | 0 | 100 | 21 | 22 | 102 |
| 2 | 20 | 80 | 32 | 26.9 | 84 |
| 3 | 33 | 67 | 40 | 34.0 | 85 |
| 4 | 50 | 50 | 44 | 38.8 | 88 |
| 5 | 67 | 33 | 46 | 39.8 | 87 |
| 6 | 80 | 20 | 46 | 37.1 | 81 |
| 7 | [a]100 | 0 | 23 | 22.6 | 98 |

[a] Davison silica gel, desiccant grade.

[b] Selectivity = $\frac{\text{Gasoline yield}}{\text{conversion}} \times 100$.

It will thus be apparent that catalysts wherein the $SiO_2/ZrO_2$ ratio is between about 90/10 and 10/90 all display significant hydrocracking activity, since the above gasoline yields are about twice as high as would have been obtained in the absence of hydrogen. It will be noted also that the catalysts wherein the $SiO_2/ZrO_2$ ratio is between about 30/70 and 70/30 display improved selectivity (at equal conversion levels), as compared to the other compositions.

EXAMPLE II

Another sample of pure silica-zirconia was prepared by coprecipitation under predominantly acidic conditions by slowly stirring aqueous sodium silicate solution into purified aqueous zirconium sulfate, the sodium silicate solution containing just sufficient excess ammonia to neutralize the zirconium sulfate solution. The final pH of the slurry was 7. The precipitate was made into finished catalyst and tested for hydrocracking as described in Example I. The results were as follows:

Table 2

| No. | Catalyst Comp., Wt. Percent | | Conversion, Vol. Percent of Feed | $C_4^+$ gasoline yield, Vol. Percent of Feed | Selectivity |
|---|---|---|---|---|---|
| | $SiO_2$ | $ZrO_2$ | | | |
| 8 | 33 | 67 | 42 | 37.5 | 89.4 |

By comparison with catalyst No. 3 of Table 1, it will be seen that the coprecipitated catalyst of this example, even though prepared under acidic conditions, displays considerable improvement both in activity and selectivity.

EXAMPLE III

To compare the effect of alkaline versus acid coprecipitation, two additional catalysts were prepared and tested. Catalyst No. 9 was prepared by slowly stirring purified aqueous zirconium sulfate solution into the alkaline silicate solution, whereby coprecipitation occurred over the pH range 13–7. Catalyst No. 10 was prepared at a relatively constant pH of 7–6 by continuously blending with agitation in a suitable mixing vessel, a stream of zirconium sulfate solution with a stream of alkaline silicate solution. The resulting precipitates were then made into finished catalysts and tested as described in Example I. The results were as follows:

Table 3

| No. | Catalyst Comp., Wt. Percent | | Conversion, Vol. Percent of Feed | $C_4^+$ gasoline yield, Vol. Percent of Feed | Selectivity |
|---|---|---|---|---|---|
| | $SiO_2$ | $ZrO_2$ | | | |
| 9 | 20 | 80 | 50 | 43.6 | 87.2 |
| 10 | 20 | 80 | 33.5 | 31.3 | 93.5 |

The marked improvement in activity as a result of alkaline coprecipitation is clearly evident.

EXAMPLE IV

Another 20% $SiO_2$–80% $ZrO_2$ catalyst (No. 11) was prepared under predominantly acid conditions of coprecipitation by slowly stirring a stream of aqueous alkaline silicate solution into a batch of aqueous zirconium sulfate solution. However, in this case, the resulting coprecipitated slurry was allowed to age for about 1 hour at a pH of 8 before being made up into catalyst. Upon testing under the conditions of Example I, the conversion was 47%, and the $C_4^+$ gasoline yield was 41.4%. By comparison with catalyst No. 10, it will be seen that marked improvement results from alkaline aging of the acid coprecipitated slurry. However, the results are still inferior to alkaline coprecipitation (cf. catalyst No. 9).

EXAMPLE V

To illustrate the effect of promoters, several different hydrogenating components were distended on a 10% $SiO_2$–90% $ZrO_2$ catalyst base. Upon testing the resulting catalysts under the conditions of Example I, the following results were obtained:

Table 4

| No. | Promoter | Conversion Vol. Percent of Feed | $C_4^+$ gasoline yield, Vol. Percent of Feed | Selectivity |
|---|---|---|---|---|
| 12 | <1% FeO | 47 | 41.7 | 88.7 |
| 13 | 1.5% $Cr_2O_3$ | 49 | 46.6 | 95.2 |
| 14 | 5.7% $Cr_2O_3$ | 50 | 49.9 | 90.8 |
| 15 | 3.1% $MoO_3$ | 52 | 51.1 | 98.4 |

It will thus be apparent that small amounts of promoters are effective for increasing the over-all activity of the catalyst, and especially for increasing the selectivity. Other promoters described hereinabove are found to give similar results.

A catalyst composition containing 30% NiS, 35% $ZrO_2$ and 35% $SiO_2$ (prepared by simultaneous alkaline coprecipitation of all three components, followed by sulfiding of the calcined catalyst) is found to give results superior to any of catalysts 12–15. In using this catalyst, hydrocracking temperatures of about 750°–850° F. are preferably utilized to obtain conversions in the 40–60% range.

EXAMPLE VI

A conventional silica-alumina cracking catalyst (88% $SiO_2$–12% $Al_2O_3$) was employed in the conversion of the recycle stock under the conditions outlined in Example I. The yield of gasoline was 21% by volume of the charge, which yield is about what would be obtained in the absence of hydrogen. The selectivity of gasoline make was 60%. It is thus apparent that conventional silica-alumina cracking catalysts are markedly inferior, both in activity and selectivity, as compared to the silica-zirconia catalysts of this invention.

EXAMPLE VII

The recycle stock was processed under the conditions outlined in Example I but in the absence of a catalyst, quartz chips being used to fill the reaction chamber. A conversion of 10% by volume of the charge to 400° F. end-point gasoline and an 83% recovery of the higher boiling fraction were obtained. This example shows that the results obtained herein are truly catalytic and not thermal.

EXAMPLE VIII

In order to compare the above results with those obtainable from a known catalyst having high hydrogenation activity, a 2.9% CoO, 8.3% $MoO_3$, 84.4% $Al_2O_3$–4.4% $SiO_2$ catalyst was evaluated under exactly the same conditions. A yield of 32% by volume of gasoline and a recovery of 40% of a heavier fraction having an API gravity of 18.1 were obtained. Thus, not only a lower activity is exhibited by this catalyst as compared to the coprecipitated catalysts of this invention, but the selectivity of 53% is the poorest of any catalyst tested.

From the above examples it will be apparent that the catalysts described herein exhibit surprisingly high activity for the hydrocracking of refractory cycle stocks and other heavy oils to produce high yields of gasoline and good desulfurization and denitrogenation of such oils. This application is a continuation-in-part of application Serial No. 735,691, filed May 16, 1958, now abandoned, which in turn is a continuation-in-part of application Serial No. 478,898, filed December 30, 1954, now abandoned. It is not intended that the invention should be restricted to the details disclosed in the examples or elsewhere, since many variations may be made by those skilled in the art without departing from the scope or spirit of the following claims.

We claim:

1. A process for hydrocracking a mineral oil feedstock boiling above the gasoline range to produce gasoline-boiling-range hydrocarbons which comprises contacting said feedstock with a hydrocracking catalyst in the presence of between about 1,000 and 10,000 SCF of hydrogen per barrel of feed, and under hydrocracking conditions, said hydrocracking catalyst comprising as essential active ingredients, zirconium oxide and silicon oxide in intimate admixture, the $ZRO_2/SiO_2$ ratio in said catalyst being between about 30/70 and 70/30 by weight, said hydrocracking conditions comprising a temperature between about 600° and 950° F., hydrogen pressure between about 500 and 5,000 p.s.i.g., and space velocity between about 0.1 and 10.0 volumes of liquid feed per volume of catalyst, said catalyst having been prepared by the coprecipitation of hydrous silica and hydrous zirconia from an aqueous medium at a pH below about 12, followed, at least in those cases where said coprecipitation is effected at a pH below about 7.5, by aging of the coprecipitated mixture in an aqueous medium at a pH between about 7.5 and 12 for about 10 minutes to 2 hours, followed by drying and calcining of the coprecipitated mixture.

2. A process as defined in claim 1 wherein said feedstock is a highly aromatic residual oil from a cracking operation conducted in the absence of added hydrogen.

3. A process as defined in claim 1 wherein said coprecipitation is carried out at a pH between about 7.5 and 12.

4. A process as defined in claim 1 wherein said coprecipitation is carried out at a pH below about 7.5, and wherein the resulting hydrous coprecipitated silicia-zirconia mixture is allowed to age in an aqueous medium at a pH between about 7.5 and 12 for about 10 minutes to 5 hours prior to said drying and calcining steps.

5. A process for hydrocracking a mineral oil feedstock boiling above the gasoline range to produce gasoline-boiling-range hydrocarbons which comprises contacting said feedstock with a hydrocracking catalyst in the presence of between about 1,000 and 10,000 s.c.f. of hydrogen per barrel of feed, and under hydrocracking conditions, the essential active ingredients of said hydrocracking catalyst being (1) a silica-zirconia composite wherein the $ZrO_2/SiO_2$ ratio is between about 30/70 and 70/30, and (2) between about 0.2% and 30% by weight, based on free metal, of a promoter selected from the class consisting of the group VIB and group VIII metals and their oxides and sulfides, said silica-zirconia composite having been prepared by the coprecipitation of hydrous silica and hydrous zirconia from an aqueous medium at a pH below about 12, followed, at least in those cases where said coprecipitation is effected at a pH below about 7.5, by aging of the coprecipitated mixture in an aqueous medium at a pH between about 7.5 and 12 for about 10 minutes to 2 hours, and thereafter drying and calcining the coprecipitated mixture.

6. A process as defined in claim 5 wherein said silica-zirconia composite is coprecipitated at a pH between about 7.5 and 12.

7. A process as defined in claim 5 wherein said coprecipitation is carried out at a pH below about 7.5, and wherein the resulting hydrous silica-zirconia mixture is allowed to age in the precipitating medium at a pH between about 7.5 and 12 for a period of time between about 10 minutes and 5 hours.

8. A process as defined in claim 5 wherein said promoter metal is selected from the class consisting of (1) between about 0.5–2% by weight of a group VIII noble metal and (2) between about 10–30% by weight of a group VIII metal of atomic number 26–28 inclusive, and wherein said hydrocracking is carried out at a pressure below about 2,500 p.s.i.g.

9. A hydrocracking catalyst consisting essentially of a coprecipitated silica-zirconia composite wherein the $ZrO_2/SiO_2$ ratio is between about 30/70 and 70/30 by weight, and intimately distributed therein between about 0.2% and 30% by weight, based on free metal, of a promoter selected from the class consisting of the group VIB and group VIII metals and their oxides and sulfides, said silica-zirconia composite having been prepared by the coprecipitation of hydrous silica and hydrous zirconia from an equous medium at a pH between about 7.5 and 12, followed by drying and calcining of the coprecipitated mixture.

References Cited in the file of this patent

UNITED STATES PATENTS

| | | |
|---|---|---|
| 2,347,648 | Thomas et al. | May 2, 1944 |
| 2,799,626 | Johnson et al. | July 16, 1957 |